United States Patent

Mueller

[15] 3,687,217
[45] Aug. 29, 1972

[54] GROUND EFFECT VEHICLE

[72] Inventor: Leonard E. Mueller, San Diego, Calif.

[73] Assignee: Carl R. Brown, San Diego, Calif. ; a part interest

[22] Filed: Dec. 4, 1969

[21] Appl. No.: 881,957

[52] U.S. Cl..................................180/120, 180/116
[51] Int. Cl..................................................B60v 1/14
[58] Field of Search.......180/117, 118, 120, 116, 126

[56] References Cited

UNITED STATES PATENTS

| | | | |
|---|---|---|---|
| 3,110,996 | 11/1963 | Dahlman | 180/116 X |
| 3,268,022 | 8/1966 | Gustafson | 180/120 X |
| 3,292,721 | 12/1966 | Dobson | 180/120 |
| 3,336,995 | 8/1967 | Farb et al. | 180/120 |
| 3,078,939 | 2/1963 | Bollum, Sr. | 180/120 X |

*Primary Examiner*—A. Harry Levy
*Attorney*—Carl R. Brown

[57] ABSTRACT

A ground effect vehicle having a downwardly blowing fan mounted on anti-torque van structure to blow air into a plenum chamber within the vehicle. The plenum chamber increases in width and height toward the rear and has a central rear outlet giving a nozzle effect, the expanding air exhausting through the outlet to provide propulsion. At opposite sides of the outlet are control outlets, which are adjustable collectively and differentially for thrust and directional control. A peripheral horizontal flange around the lower edge of the vehicle guides the outflow of air and adds to stability. In model form the entire frame structure of the vehicle can be made as a unitary thin shell molding.

5 Claims, 5 Drawing Figures

INVENTOR.
LEONARD E. MUELLER
ATTORNEY

GROUND EFFECT VEHICLE

BACKGROUND OF THE INVENTION

In ground effect vehicles of the plenum chamber type, lift is provided by the cushion of air in the plenum chamber, which exhausts peripherally, and propulsion can be obtained by diverting part of the air or by separate thrust means. Ducts have been used to carry air to various nozzles for directional control, but efficiency is low and the structure becomes complex. The air exhausting around the lower peripheral edge or skirt of the vehicle tends to roll and become turbulent, the vehicle being unstable and having the tendency to slip horizontally on the slightest disturbance of balance.

SUMMARY OF THE INVENTION

The ground effect vehicle described herein is a simple plenum chamber type, but has novel features which improve stability and propulsion efficiency. Substantially the entire body of the vehicle forms a plenum chamber, which increases in width and height toward the rear to cause expansion of air in that direction through a rear outlet, resulting in a nozzle effect. The rearward ejection of air provides propulsion thrust, which is augmented or modified for directional control by adjustable outlet flaps on each side of the primary outlet. To add to the propulsion flow the thrust axis of the air pumping fan is inclined slightly to the rear. Stability of the vehicle is enhanced by a peripheral outwardly extending flange on the lower edge of the body, which guides the outflowing air in a generally flat sheet in the immediate vicinity of the vehicle. The torque of the fan is opposed by anti-torque vanes incorporated into the fan support structure, directly in the high velocity air flow.

An object of this invention, therefore, is to provide a ground effect vehicle having improved stability and propulsion characteristics. Other objects and many advantages of this invention will become more apparent upon a reading of the following detailed description and an examination of the drawings, wherein like reference numerals designate like parts throughout and in which:

DESCRIPTION OF THE PREFERRED EMBODIMENT

Figure 1:
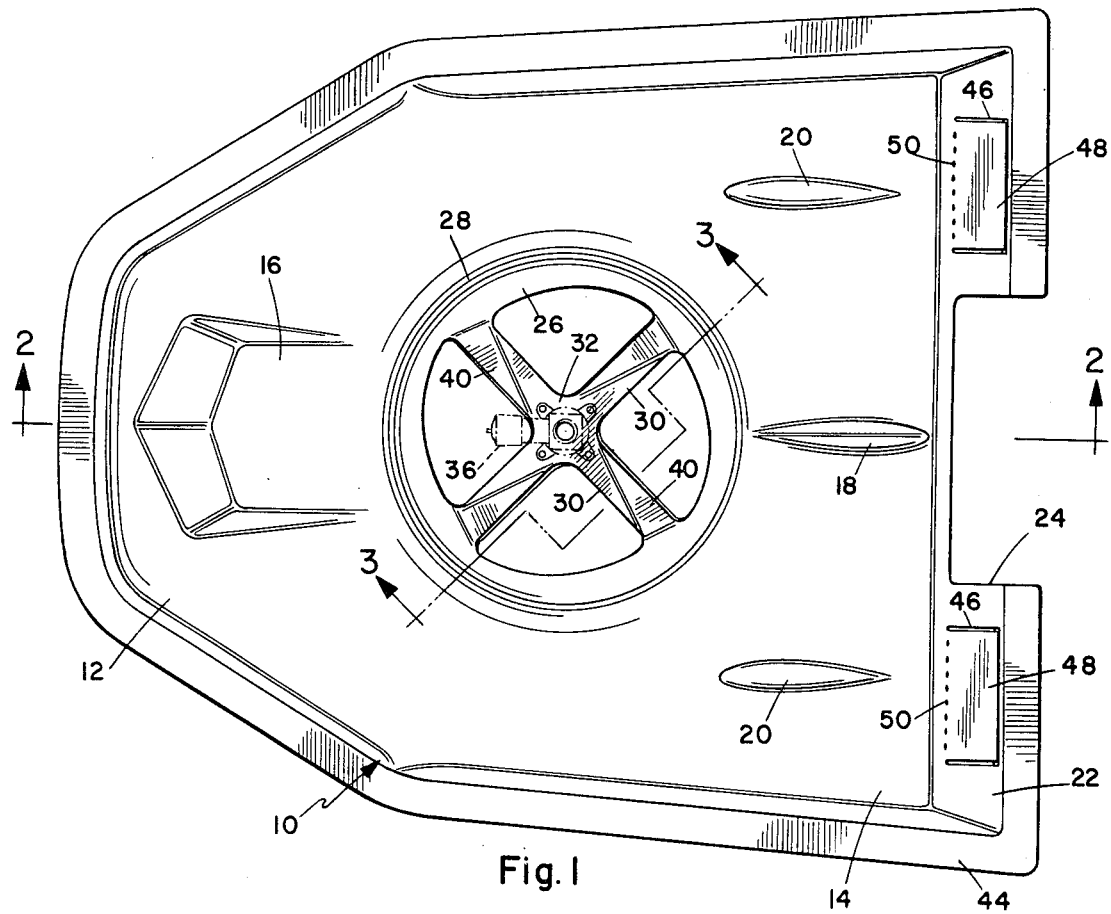
FIG. 1 is a top plan view of the vehicle.

The vehicle as shown is in a model configuration, molded, pressed, or otherwise formed as a unitary thin shell structure, but could obviously be built up in any suitable manner. The hollow body 10 has a narrow nose portion 12, diverging to a rear body 14 of gradually increasing width and height toward the rear, the body being upwardly domed and completely open on the underside. The exact configuration of the body is not critical, a forward cabin 16 and rear fins 18 and 20 being indicated to stiffen the structure and add realism to the appearance. At the rear the body has a downwardly and rearwardly inclined flat wall 22, with a large central outlet 24 extending to the lower edge of the wall.

Figure 2:
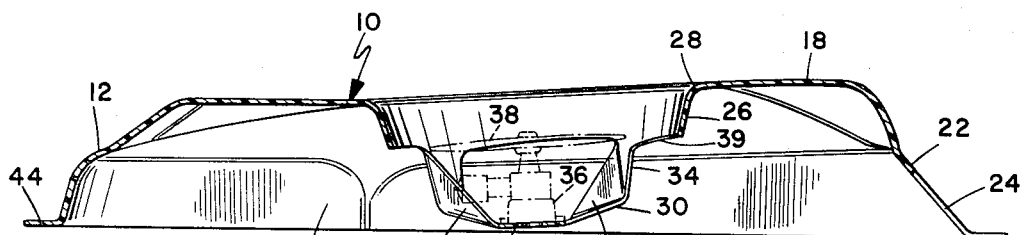
FIG. 2 is a sectional view taken on line 2—2 of FIG. 1.
Figure 3:
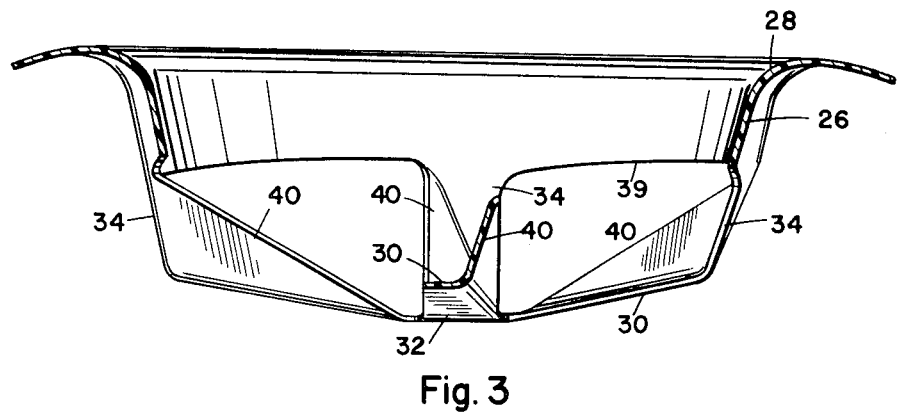
FIG. 3 is an enlarged sectional view taken on line 3—3 of FIG. 1.
Figure 4:
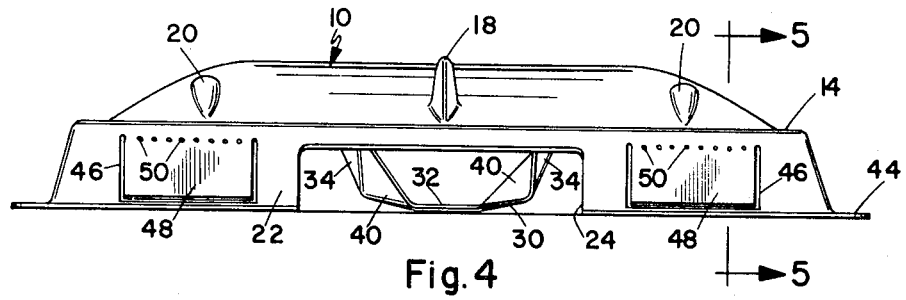
FIG. 4 is a rear elevation view of the vehicle.
Figure 5:
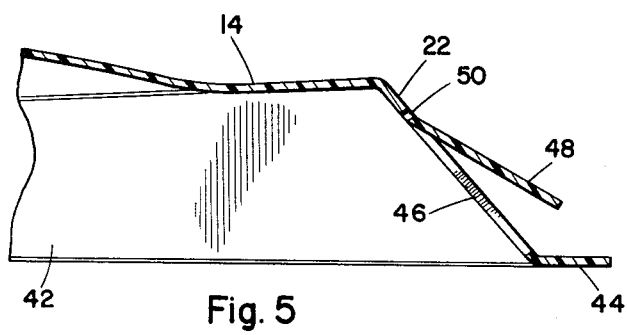
FIG. 5 is an enlarged sectional view taken on line 5—5 of FIG. 4.

In the central portion of body 10 is a circular duct 26, having a smoothly curved annular inlet lip 28 and extending down into the body. Below duct 26 is a cruciform structure formed by arms 30 joined at a central platform 32, and suspended on post portions 34 extending downwardly from the lower edge of the duct. The platform 32 provides a mounting for the power unit 36, shown in broken line in FIGS. 1 and 2. The power unit is shown as a small internal combustion engine of the type used in model aircraft and drives a downwardly thrusting propeller 38, whose plane of rotation is at or slightly above the lower edge 39 of the duct 26. To counteract the torque of the propeller, anti-torque vanes 40 are incorporated into the arms 30 and post portions 34, directly in the propeller slipstream. Air is thus deflected outwardly below the duct to fill the plenum chamber 42 formed by the entire underside of the body. To initiate airflow toward the rear for propulsion, the platform 32 is inclined to direct the propeller thrust axis slightly rearwardly, an inclination of a few degrees being sufficient.

With the power unit 36 in operation, the air cushion developed in plenum chamber 42 lifts the vehicle a short distance above the surface and air spills out around the periphery of the body. Some lift is developed by the inward flow of air over the domed body and the curved lip 28 of the duct. Stability of the vehicle is greatly enhanced by a substantially flat peripheral flange 44 projecting outwardly from the lower edge of the body, the flange being interrupted only at outlet 24. The flange guides the airflow outwardly in a generally flat sheet clear of the vehicle and provides a uniform cushion effect with minimum turbulence.

Due to the rearward enlargement of the cross sectional area of the plenum chamber, the air expands toward the rear of the vehicle and a portion exhausts through outlet 24, providing propulsion thrust.

To give the vehicle some degree of control, other than speed control of the power unit, wall 22 has an opening 46 on each side of outlet 24, each opening being provided with a flap 48 hinged at the top. In the simple form shown, perforations 50 are indicated along the top of each flap to facilitate bending. It will be obvious that mechanical hinges could be used and suitable actuating means installed to operate the flaps. Open or closing both flaps 48 equally, propulsive thrust is correspondingly increased or decreased. Unequal opening of the flaps will result in differential thrust and provide directional control of the vehicle.

Operating height of the vehicle above the surface will depend on the volumetric flow of air pumped into plenum chamber 42 by the propeller 38. The vehicle is capable of travelling over any surface whose irregularities are not large enough to physically impede the vehicle. Even at low power and correspondingly low surface clearance, the vehicle is stable due to the uniform cushion flow guided by flange 44. The tapered, somewhat wedge shaped body, which is widened toward the rear and has inwardly inclined sides as shown, has a self-correcting effect to yawing or skidding forces which enhances lateral stability.

Having described my invention, I now claim:

1. A ground effect vehicle comprising,
    a hollow body having an open lower portion and defining a plenum chamber therein,
    a duct in the central portion of said body, extending downwardly into said plenum chamber,
    driven, downwardly thrusting propeller means mounted in said duct,
    the lower edge of said body having a substantially flat, outwardly extending peripheral flow guiding flange,
    the cross sectional area of said plenum chamber increasing progressively rearwardly,
    the rear of said body having an outlet therein for propulsive thrust,
    and the rear portion of said body having openings on opposite sides of said outlet, each of said openings having an adjustable flap therein.

2. A ground effect vehicle according to claim 1, wherein said body increases in width and height toward the rear, the rear portion of the body having a wall with said air outlet substantially central therein.

3. A ground effect vehicle according to claim 1, and including anti-torque vanes mounted below said duct in the slipstream of said propeller means.

4. A ground effect vehicle according to claim 3, wherein said anti-torque vanes include post portions depending from said duct, inwardly extending arm portions, and a platform interconnecting said arms, said propeller means being mounted on said platform.

5. A ground effect machine according to claim 4, wherein the thrust axis of said propeller means is inclined downwardly and rearwardly.

* * * * *